United States Patent
Nazarian et al.

(10) Patent No.: US 11,983,727 B2
(45) Date of Patent: May 14, 2024

(54) SYSTEM AND METHOD FOR DATA-DRIVEN INSIGHT INTO STOCKING OUT-OF-STOCK SHELVES

(71) Applicant: WALMART APOLLO, LLC, Bentonville, AR (US)

(72) Inventors: Ehsan Nazarian, Rogers, AR (US); Behzad Nemati, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 484 days.

(21) Appl. No.: 17/402,011

(22) Filed: Aug. 13, 2021

(65) Prior Publication Data
US 2022/0027927 A1    Jan. 27, 2022

Related U.S. Application Data

(63) Continuation of application No. 15/940,295, filed on Mar. 29, 2018, now abandoned.

(60) Provisional application No. 62/479,738, filed on Mar. 31, 2017.

(51) Int. Cl.
 G06Q 30/02 (2023.01)
 G06F 15/76 (2006.01)
 G06N 20/00 (2019.01)
 G06Q 10/087 (2023.01)
 G06Q 30/0202 (2023.01)

(52) U.S. Cl.
 CPC ......... *G06Q 30/0202* (2013.01); *G06F 15/76* (2013.01); *G06N 20/00* (2019.01); *G06Q 10/087* (2013.01)

(58) Field of Classification Search
 CPC .. G06Q 30/0202; G06Q 10/087; G06F 15/76; G06N 20/00
 See application file for complete search history.

(56) References Cited

U.S. PATENT DOCUMENTS

| | | |
|---|---|---|
| 5,168,445 A | 12/1992 | Kawashima et al. |
| 6,609,101 B1 | 8/2003 | Landvater |
| 7,240,027 B2 | 7/2007 | McConnell et al. |
| 7,552,066 B1 | 6/2009 | Landvater |
| 7,644,863 B2 | 1/2010 | Chen et al. |
| 7,734,495 B2 | 6/2010 | Klaubauf et al. |

(Continued)

OTHER PUBLICATIONS

Walter, Overfitting, Regularization, and Hyperparameters, 2015, https://dswalter.github.io/overfitting-regularization-hyperparameters.html, pp. 1-5 (Year: 2015).*

(Continued)

*Primary Examiner* — John Van Bramer
(74) *Attorney, Agent, or Firm* — Morgan, Lewis & Bockius LLP; Manita Rawat

(57) ABSTRACT

In various examples, a system identify a first issue object associated with the alert by making a first set of determinations, based on an alert of an active issue of a system resource. Additionally, the system can determine whether the active issue associated with the first issue object can be automatically corrected by one or more self-healing processes, based on the first issue object. Moreover, the system can implement the one or more self-healing processes, based on determining that the active issue associated with the first issue object can be automatically corrected by one or more self-healing processes.

20 Claims, 6 Drawing Sheets

(56) References Cited

U.S. PATENT DOCUMENTS

| | | |
|---|---|---|
| 8,285,582 B2 | 10/2012 | Bateni et al. |
| 8,321,302 B2 | 11/2012 | Bauer et al. |
| 9,483,790 B2 | 11/2016 | Marshall et al. |
| 10,546,269 B1 | 1/2020 | Gaurav et al. |
| 10,748,072 B1 | 8/2020 | Seeger et al. |
| 2001/0004969 A1 | 6/2001 | Arai |
| 2002/0161475 A1* | 10/2002 | Varga ................. G07F 5/18 700/231 |
| 2003/0126103 A1 | 7/2003 | Chen et al. |
| 2003/0154141 A1 | 8/2003 | Capazario et al. |
| 2003/0200129 A1 | 10/2003 | Klaubauf et al. |
| 2003/0216969 A1 | 11/2003 | Bauer et al. |
| 2005/0149414 A1 | 7/2005 | Schrodt et al. |
| 2005/0267791 A1 | 12/2005 | LaVoie et al. |
| 2006/0004624 A1 | 1/2006 | Anderson |
| 2007/0061210 A1 | 3/2007 | Chen et al. |
| 2008/0147475 A1 | 6/2008 | Gruttadauria |
| 2009/0037283 A1 | 2/2009 | Anderson |
| 2009/0281973 A1* | 11/2009 | Selinger .............. G06Q 30/02 706/14 |
| 2010/0138281 A1 | 6/2010 | Zhang et al. |
| 2013/0013371 A1 | 1/2013 | Katsakhyan et al. |
| 2013/0144757 A1 | 6/2013 | Bauer et al. |
| 2014/0032379 A1 | 1/2014 | Schuetz et al. |
| 2014/0052498 A1 | 2/2014 | Marshall et al. |
| 2014/0058794 A1 | 2/2014 | Malov et al. |
| 2014/0108094 A1* | 4/2014 | Beddo .............. G06Q 30/0202 705/7.31 |
| 2014/0201042 A1* | 7/2014 | Meyer .............. G06Q 10/087 705/28 |
| 2014/0304123 A1 | 10/2014 | Schwartz |
| 2015/0032502 A1 | 1/2015 | Green et al. |
| 2015/0178654 A1 | 6/2015 | Glasgow et al. |
| 2015/0235157 A1 | 8/2015 | Avegliano et al. |
| 2015/0242918 A1 | 8/2015 | McCarthy |
| 2016/0048798 A1 | 2/2016 | Meyer et al. |
| 2016/0132821 A1 | 5/2016 | Glasgow et al. |
| 2016/0304280 A1 | 10/2016 | Elazary et al. |
| 2016/0304281 A1* | 10/2016 | Elazary ................. B25J 15/06 |
| 2016/0371613 A1 | 12/2016 | Ulrich et al. |
| 2017/0068973 A1 | 3/2017 | Sinkel |
| 2017/0116631 A1 | 4/2017 | Sarin et al. |
| 2017/0147966 A1 | 5/2017 | Aversa et al. |
| 2017/0193435 A1 | 7/2017 | Sarin et al. |
| 2017/0278053 A1 | 9/2017 | High et al. |
| 2018/0005174 A1 | 1/2018 | Dixon et al. |
| 2018/0114257 A1 | 4/2018 | Conville et al. |
| 2018/0204172 A1 | 7/2018 | Sabuz |
| 2020/0061839 A1 | 2/2020 | Deyle et al. |
| 2020/0219042 A1* | 7/2020 | Gaurav ............. G06Q 10/087 |
| 2020/0249070 A1 | 8/2020 | Gurumohan et al. |

OTHER PUBLICATIONS

Decision Making with Coupled Learning: Applications in Inventory Management and Auctions Chaneton, Juan Manuel, Columbia University Dissertation, Proquest, 2015.

MLP neural network-based regional logistics demand prediction Guo, Hongpeng ; Guo, Cheng ; Xu, Beichun ; Xia, Yujie ; Sun, Fanhui Neural computing & applications, May 1, 2021, vol. 33 (9), p. 3939-3952.

* cited by examiner

SYSTEM AND METHOD FOR DATA-DRIVEN INSIGHT INTO STOCKING OUT-OF-STOCK SHELVES

CROSS-REFERENCE TO RELATED APPLICATIONS

This application is a continuation of U.S. patent application Ser. No. 15/940,295 filed Mar. 29, 2018, which claims benefit of priority to U.S. Provisional Patent Application No. 62/479,738 filed Mar. 31, 2017; the aforementioned priority applications being hereby fully incorporated by reference in their entireties.

BACKGROUND

1. Technical Field

The present disclosure relates to identifying when to restock shelves, and more specifically to using cameras, sensors, and sales transactions to identify when sales are made and maximize the rate of sales.

2. Introduction

The rate at which products are sold is a critical element for any business. In general terms, gross income for sales of a product can be written as gross income=sales price per unit*total units sold (* being a symbol of multiplication). The total units sold equation can be further broken down to total units sold=average units sold per unit of time*time. Under certain conditions, the average units sold per unit of time, or sales rate for the product, can change. For example, if there are not products in stock, or not sufficient units on a shelf, the rate of sales will decrease or stop. To maximize profits, businesses will seek to maintain the sales rate as high as possible.

SUMMARY

An exemplary method for practicing the concepts disclosed herein can include: receiving, at a server and from a database, a current shelf inventory of a product on a shelf in a store; generating, at the server and based on the current shelf inventory of the product, and using a rate of sales model specific to the product, a schedule for restocking the product on the shelf; receiving, at the server, a real-time notification that at least one unit of the product has been removed from the shelf; modifying the current shelf inventory based on the notification, to yield an updated shelf inventory; modifying the rate of sales model based on the sale, to yield an updated rate of sales model specific to the product; and generating, using the updated shelf inventory and the updated rate of sales model, an updated schedule for restocking the product on the shelf.

An exemplary system configured to practice the concepts disclosed herein can include: a processor; and a computer-readable storage medium having instructions stored which, when executed by the processor, cause the processor to perform operations comprising: receiving, from a database, a current shelf inventory of a product on a shelf in a store; generating, based on the current shelf inventory of the product and using a rate of sales model specific to the product, a schedule for restocking the product on the shelf, wherein the rate of sales model has calculated rates of sale based on shelf inventory; receiving a real-time notification from a camera monitoring the shelf that at least one unit of the product has been removed from the shelf; modifying the current shelf inventory based on the notification, to yield an updated shelf inventory; modifying the rate of sales model based on the sale, to yield an updated rate of sales model specific to the product; and generating, using the updated shelf inventory and the updated rate of sales model, an updated schedule for restocking the production the shelf.

An exemplary non-transitory computer-readable storage medium configured to perform operations as disclosed herein can have instructions comprising: receiving, from a database, a current shelf inventory of a product on a shelf in a store; generating, based on the current shelf inventory of the product and using a rate of sales model specific to the product, a schedule for restocking the product on the shelf, wherein the rate of sales model has calculated rates of sale based on shelf inventory; receiving a real-time notification from camera monitoring the shelf that at least one unit of the product has been removed from the shelf; modifying the current shelf inventory based on the notification, to yield an updated shelf inventory; modifying the rate of sales model based on the sale, to yield an updated rate of sales model specific to the product; and generating, using the updated shelf inventory and the updated rate of sales model, an updated schedule for restocking the product on the shelf.

Additional features and advantages of the disclosure will be set forth in the description which follows, and in part will be obvious from the description, or can be learnedly practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learnedly the practice of the principles set forth herein.

DETAILED DESCRIPTION

Figure 1:
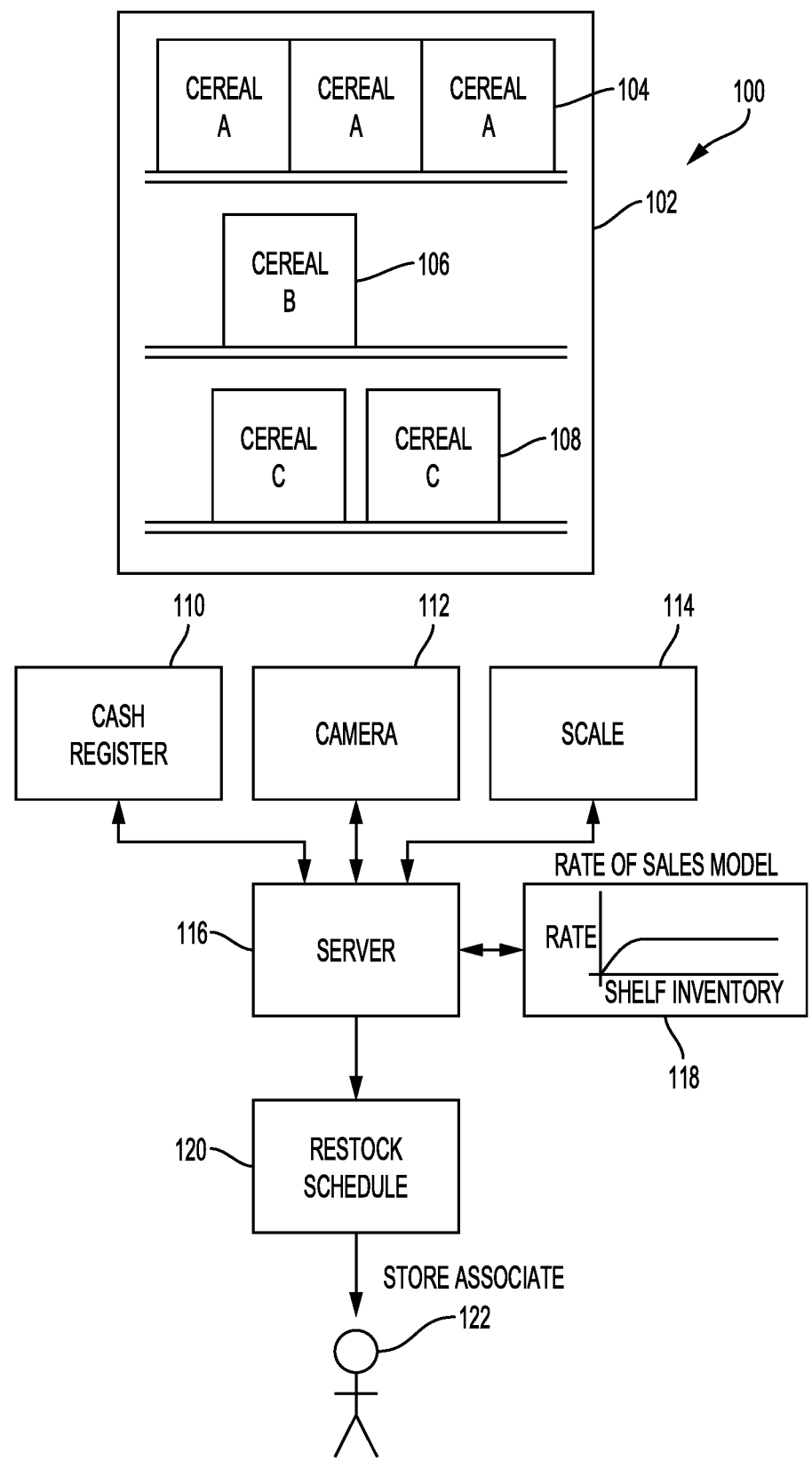
FIG. 1 illustrates an exemplary system architecture.

To try to increase sales, and subsequently increase profits, businesses can use the concepts disclosed herein to maintain shelf inventory levels to achieve preferred rates of sale. More specifically, systems configured as disclosed herein can identify when the lack of a product on a shelf begins to negatively affect the rate of sales for that product, and issue a notification to an autonomous vehicle, robot, or a store associate to restock the shelf. The system may also identify when sales of the item are negatively impacted because there is too much inventory available on the shelf, and subsequently withhold restocking of an item so that the available shelf inventory eventually reaches level with a higher rate of sales.

To identify the levels of shelf inventory which promote (or hinder) sales of a product, the system collects the number of items stored on a shelf in real-time using cameras, scales, and/or sales data from cash registers. This data is combined with time stamps indicating when the product is removed from the shelf, or when the sale occurred. The system can then, using the combined data, create a rate of sales model for specific products which predicts the sales rate of the product based on the amount of the product which is on the shelf. Over time, this model can be updated with new information, allowing the model to become more accurate. By having a more accurate model, the schedule for when the product is restocked can become more efficient, thereby improving sales (because the restocking will be performed to maintain a desired rate of sales), while also improving the restocking process. Embodiments of the invention allow restocking to occur before the inventory level falls below a threshold that maintains a desired sales rate.

As products are moved in a store, the rate of sales of the product may shift. For example, if a product is moved from eye-level on a shelf to the bottom of a shelf, the rate of sales of the product may decrease. However, due to the iterative and periodic updating processes used to maintain current rate of sales models based on real-time data, the rate of sales models can self-correct within several iterations of the updating process, resulting in rate of sales models which are updated to reflect the new location of the product.

In addition to updating the rate of sales models of specific products, one or more machine learning algorithms/models can be applied to information such as day of the week (weekday versus weekend), weather, parameters, calendar information (holidays), and market information (new stores, competition, etc.), to further refine the rates of sales models. This results in two levels of iteratively updating models and algorithms to provide improved sales forecasting: a first layer which tunes a machine learning model (or models) to avoid overfitting, and a second layer which iteratively tunes sales models based on inter-purchase times.

In some cases, the system can predict that below a certain threshold level of inventory on the shelf the rate of sales for a given product begins to quickly drop, whereas above that threshold level of inventory the rate of sales for that product is relatively stable. In such cases, the system can predictively set a restocking schedule to refill the shelf inventory of the product just before the shelf inventory is expected to reach the threshold.

In other instances, the system can predict that the rate of sales decreases both when the shelf inventory is above and below threshold amounts. In other words, there is a value of shelf "fullness" which, if exceeded, slows down the rate of sales, and another value which, if the shelf volume is less than, similarly slows down the rate of sales. The system will therefore adjust the restocking schedule (both the amount being restocked and the frequency of restocking) to try and keep the amount of product on the shelf with the range between the upper and lower values.

Consider the example of bread, water, or toilet paper on a store shelf before a snowstorm, hurricane or other (predictable) natural disaster. In some stores, the rate of sales for these products may remain constant regardless of the amount of inventory present on the shelf. However, in some instances, the rate of sales might increase if customers detect a threshold level of scarcity. That is, customers might buy more bread, water, or toilet paper if the shelf appears half-empty or nearly empty than if the shelf were full or mostly full. Systems configured according to this disclosure can identify how customers react, in terms of sales, to specific shelf inventory levels and adjust restocking to maximize those reactions.

Detection of merchandise being removed from a store shelf can occur through the use of cameras, scales, signals received from a cash register at the point of sale, RFID tags, and/or any other detection mechanism. For example, a camera or cameras which can view shelf inventory can take periodic pictures or video of the shelf, and a server or other computer configured to perform image comparisons can compare the images to determine changes in inventory. An autonomous vehicle or robot may also be used to detect items removed from shelfs. The robots may move through the aisles and obtain images of the shelfs. The image may be stored and compared to prior images to detect items removed for the shelves.

Such image comparison may rely, for example, on a percentage of shadow present in each respective image. A scale sensor may, for example, be built into the shelf to identify when products are placed and subsequently removed from the shelf. Shelves may likewise be configured to have RFID detection such that when products are placed on the shelf, the shelf can identify the reception of a product and communicate that the product was received to an inventory monitoring server. Likewise, such a shelf can identify the removal of a product from the shelf and report the removal to the inventory monitoring server. Yet another mechanism for identifying current shelf inventory is recording a shelf inventory when an autonomous vehicle, robot, or store associate restocks a shelf with a product, then recording purchases based on electronic transmissions from cash registers to the inventory monitoring server.

In each of these examples, the number of products removed from the shelf at any instant can be timestamped and recorded. For example, the record of items being removed from the shelf can be recorded in a historical sales database, which can later be used by the server or another computing device to build a rate of sales model for the product, the rate of sales model estimating future sales based on the historical record of when sales occurred and the quantity of such sales. In one configuration, the rates of sales model provides estimates of rate of sales of a given product solely on the amount of inventory on the shelf. In other configurations, the rate of sales model can be based on additional factors, forming a multi-dimensional model. For example, rather than being a two-dimensional model connecting the rate of sales and shelf inventory, the rate of sales model can be an N-dimensional model using any number of factors as required by a specific configuration.

For example, the rate of sales model can, for example, calculate the inter-purchase time per customer entering the store, and can then predict the rate of sales based on both the current shelf inventory level and/or the number of customers in the store. In some configurations, the model can be further updated based on demographics of the customers entering the store. For example, rather than just basing the sales rate on the total number of customers in the store, the sales rate could be calculated on the respective numbers of men and/or women in the store, the number of children, the number of people shopping alone versus groups, the number of people in a group shopping together (that is, is the group two people or ten people?), customers using a shopping cart versus a shopping basket, customers requiring a motorized shopping cart, sales staff on the floor, sales staff on an aisle next to the product, etc. All of these factors can be updated in real-time based on camera information collected as customers enter or shop within a store, based on the positions of store associates, information collected and uploaded to a server by a store greeter, scales/laser counters as individuals enter and leave the store, or in other practical ways of collecting such data.

Having provided a summary of the invention, the disclosure now turns to the specific examples and configurations illustrated in FIGS. 1-5. While specific implementations are described, it should be understood that this is done for illustration purposes only. Other components and configurations may be used without parting from the spirit and scope of the disclosure, and elements from each example may be combined or removed as required based on the specific needs of a practicing entity. Such variations shall be described herein as the various embodiments are set forth. The disclosure now turns to FIG. 1.

FIG. 1 illustrates an exemplary system architecture 100. In this example 100, a store shelf 102 contains products 104, 106, 108, each of which has distinct levels of shelf inventory present. For example, "Cereal A" 104 appears to be at maximum shelf capacity, "Cereal B" 106 appears to be close to empty, and "Cereal C" 108" appears to have a shelf inventory level between the relative capacities of the other products 104, 106. The respective level of inventory of each product 104, 106, 108 can be identified and recorded using cash register 110 data which is communicated, in real-time by sending an electronic signal from a cash register 110 processing a sale of the product to a receiving computer (such as a server 116).

Alternatively, the level of inventory can be identified using a camera 112 which can view the products 104, 106, 108 as they rest on the shelf 102. The camera 112 may be mounted on a robot or autonomous vehicle that moves through the store. The autonomous vehicle determines its location in the store (aisle, shelf location, etc.). The camera of other imaging device is used to identify the item of the shelf and its quantity. The camera 112 can send images of the products 104, 106, 108 on the shelf 102 to the server 116, which can record the video or images and perform an image recognition to identify when products have been removed from the shelf 102. The image recognition can, for example, use colors, shadows, or specific writing on products (i.e., the names or labels on the products 104-108) to identify filled or empty spots for products on the shelf 102, and from that information determine how much product is being stored on the shelf. For example, if the camera 112 detects that shadows (or markings not associated with the product) fill 50% of the space in animate, based on that information the server 116 can determine the amount of inventory on the shelf 102 by knowing the dimensions of the product and having access to previous shadow calculations.

In yet other configurations, the amount of product on the shelf 102 can be determined using a scale 114, where the weight of each product is known, and a scale is built into each shelf rack of the shelf unit 102. As products 104-108 are restocked by a store associate, the scale 114 for each shelf can send electronic signals indicating the increased weight to the server 116. The server 116 can, upon identifying that the increased weight indicates a certain number of retail units of a product being added to the shelf, can update the current shelf inventory for that particular product. As customers later remove products from the shelf, the scale 114 can detect a decrease in the weight of the shelf, send a signal to the server 116 noting the decreased weight, and the server 116 can update the current shelf inventory accordingly.

To maintain shelf inventory at a desired level, the server 116 retrieves a rate of sales model 118 from a database. The rate of sales model 118 is generated using historical sales data which is timestamped, then combined with the shelf inventory levels recorded by the server 116, resulting in a model 118 which describes the rate of sales of the product based on the current shelf inventory (and/or other factors). Using the current shelf inventory and the rate of sales model 118, the server 116 can predict when the shelf 102 will need to be restocked to maintain desired sales rates. The server 116 can then generate a restock schedule 120 and send that restock schedule 120 to an autonomous vehicle, robot, or a store associate 122, thereby informing an autonomous vehicle, robot, or a store associate 122 when the shelf 102 needs to be restocked. For example, the server 116 can transmit an electronic message regarding the restocking schedule to a mobile device (such as a smartphone, MC40, or other data collection terminal) associated with the store associate 122 or to a robot.

The robot may receive the request for the item and the number of items to restock. The robot can determine the location in the stock room of the items and retrieve the items. The robot may also determine the aisle and shelf location for the items, and proceed to restock the item.

FIGS. 2A-2D illustrate exemplary rate of sales models which can be used by the server 116 to determine when a product should be restocked to maintain a desired sales rate. In example FIG. 2A, 202, the rate of sales remains constant 204 over most amounts of shelf inventory, but begins to decrease 206 sharply once the shelf inventory reaches a certain level. For such a product, the server 116 may seek to maintain the rate of sales at the constant/high level 204 as long as possible, while also minimizing the effort of restocking. To achieve this goal, the server 116 can determine that the shelf should be restocked just before the shelf inventory is projected to hit the point at which sales begin to decrease 206, and that the amount placed on the inventory should be as much as possible (because there is no negative outcome on the rate of sales due to excessive shelf inventory).

Figure 2A:
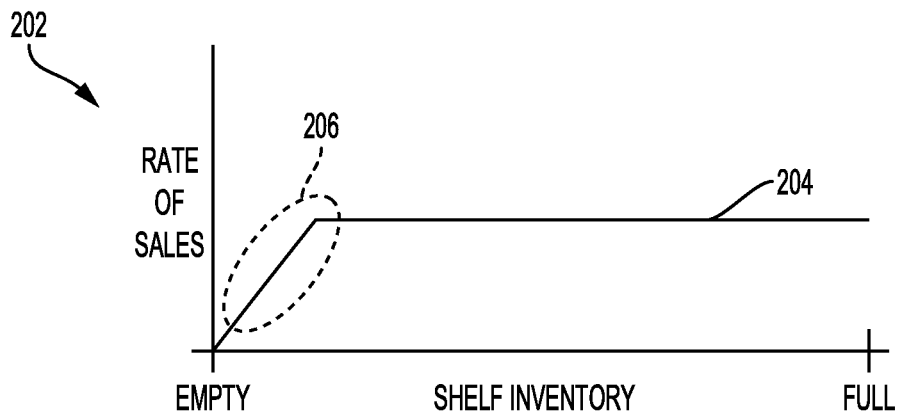
FIGS. 2A-2D illustrate exemplary rate of sales models.
Figure 2B:
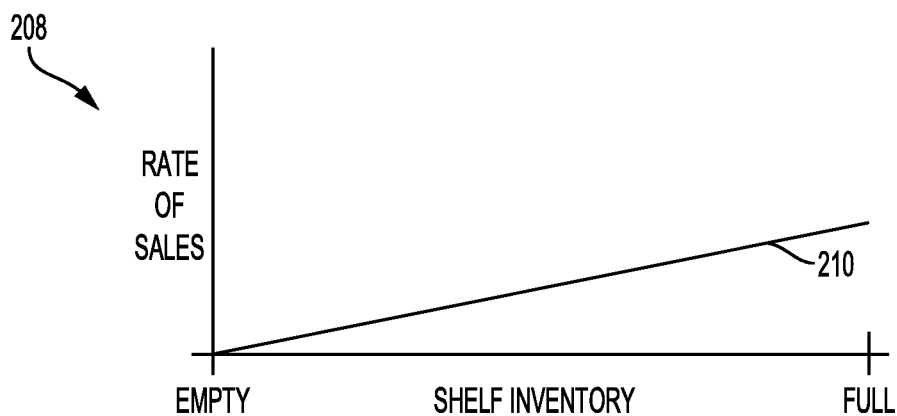

In example FIG. 2B, 208, the rate of sales constantly decreases 210 linearly, such that any decrease in the shelf inventory results in a corresponding decrease in the rate of sales. In such a configuration, the server 116 will seek to maintain the shelf inventory as high as possible but may also use other factors, such as the value of potential sales compared to the value of a store associate's time spent restocking the product. In addition, the server 116 may identify alternative restocking procedures for such an item, such as constantly restocking the product with a few retail units for the shelf every time nearby products are restocked, rather than initiating large restocking events.

Figure 2C:
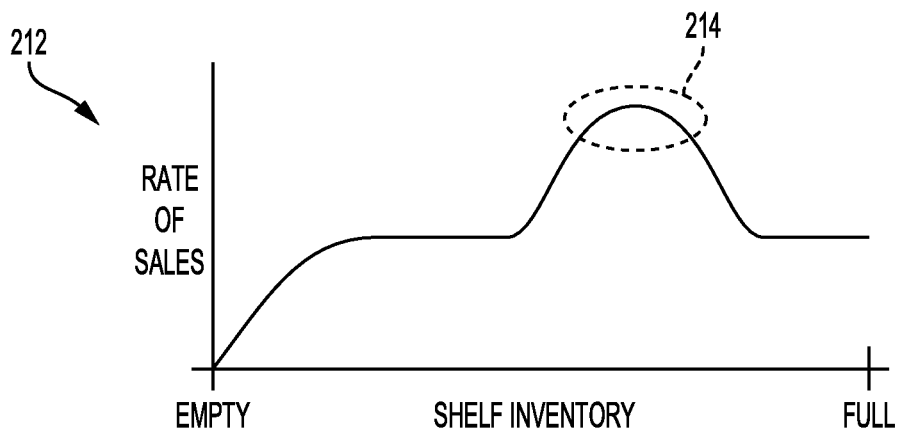

In example FIG. 2C, 212, the rate of sales varies based on the shelf inventory level, with an apex 214 occurring below full shelf capacity. In such a scenario, the server 116 will seek to maintain the shelf inventory within the apex 214 range, and can initiate restocking notifications based on that range, such that the inventory does not exceed the upper limit of the apex 214 range or fall below the lower limit of the apex 214.

Figure 2D:
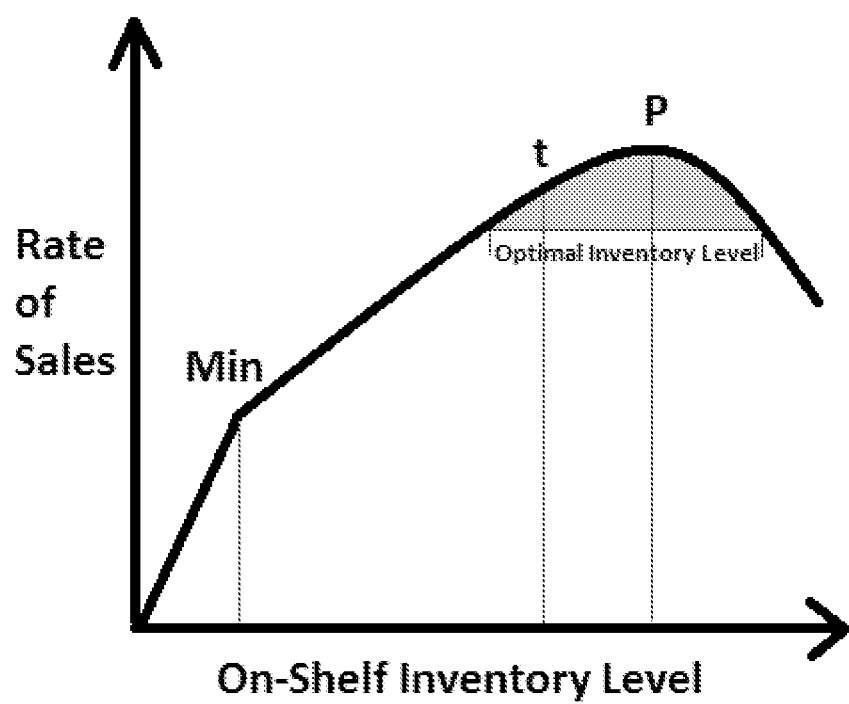

In example FIG. 2D, illustrates another rate of sales graph for a product. The sales rate for the product is determined based on the factors described herein. The on-shelf inventory level "P" that results in the highest rate of sales is identified. A minimum threshold for the on-shelf inventory may also be identified. This may be the level below which the rate of sales should robot drop. This level "Min" may be set by a user, such as a store manager or associate. A replenishment frequency may also be determined. This may also be set by a user, such as a store manager or associate. An employee or robot is not able to wait at the shelf at all times and re-stock the item. There are other items to stock and tasks to be performed, with fixed resources to do so. An optimal range for the on-shelf inventory "t" is determined based on the maximum replenishment rate. The time for the next replenishment is determined based on the rate of sales for the current inventory level. This may be done to maintain the optimal sales rate and/or to not drop below the minimum threshold for the sales rate. The number of items that need to be replenished is also determined. Forecast how long it will take for the replenishment to occur. For example, if the sales rates for an item drops off once twelve items are on the shelf frequency, there are 15 items on the shelf, the rates of sales is three every hour; the replenishment request should be made so that the number of items on the shelf does not fall below 12. The replenishment request for the determined amount is made on the time calculated.

Figure 3:
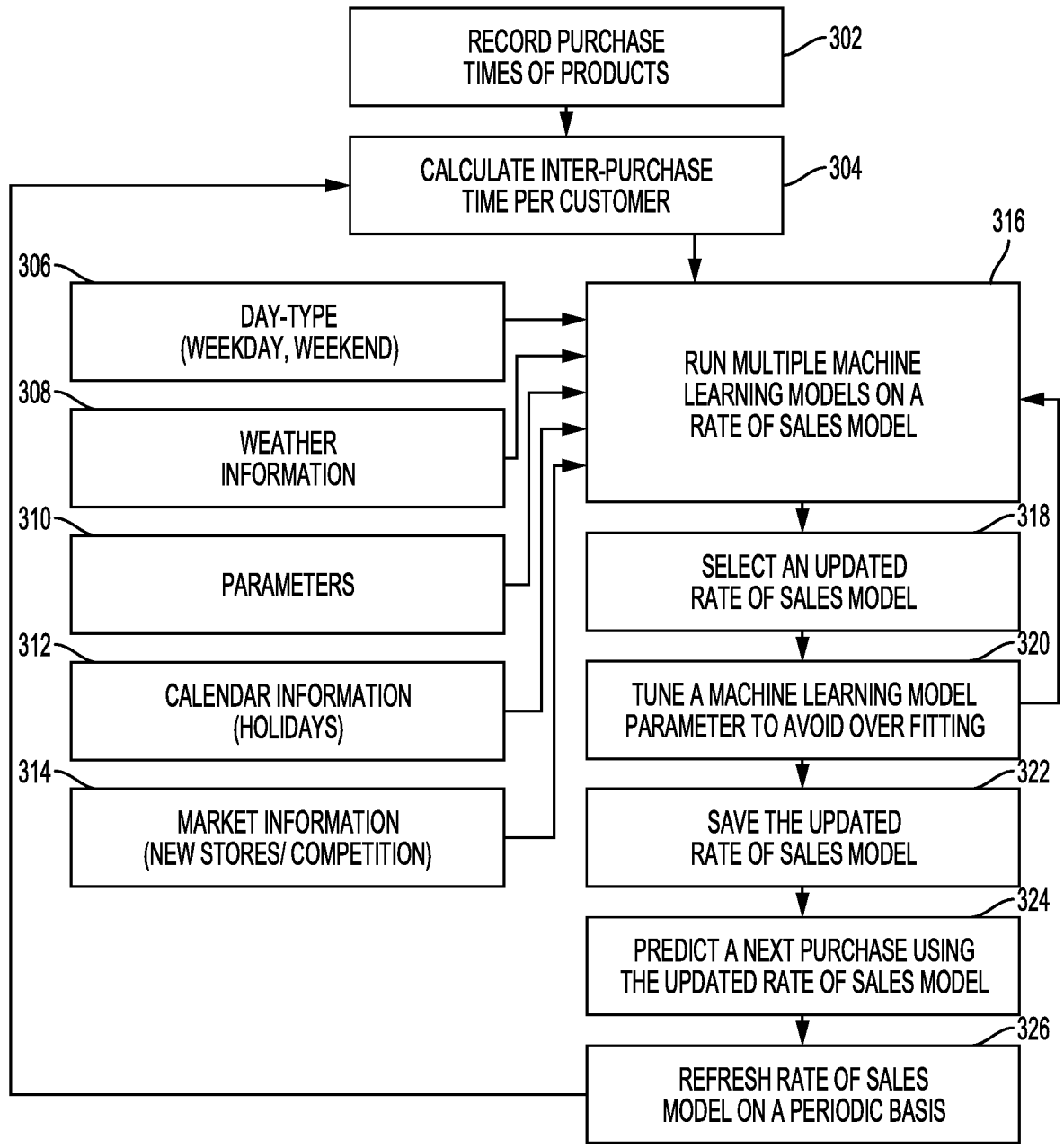
FIG. 3 illustrates a multi-layered machine learning process for predicting shelf inventory levels.

FIG. 3 illustrates an exemplary multi-layered machine learning process for predicting shelf inventory levels. In this example, there are two distinct points of feedback-a tuning of a machine learning model parameter to avoid over fitting 320, which improves the machine learning models being used to generate rate of sales models, and recalculating inter-purchase times per customer based on updated sales data/updated sales models. The multiple points of feedback result in real-time improvements to the sales prediction technology, allowing the sales prediction to be faster and/or more accurate.

In this example, a server 116 records purchase times of products 302. In other configurations, this record can be for anytime a customer removes a product from a shelf, rather than actually performing the purchase. Based on purchase times of products 302, the server 116 calculates inter-purchase time per customer 304 for the product. The server 116 receives other information 306-314, such as the day-type (if the current day of the week is a weekday, weekend, or other particular type/classification of day) 306, weather information 308, stored parameters 310 used to normalize or otherwise manipulate models to provide more accurate forecasting, calendar information (such as holidays, or days following holidays) 312, and/or market information (such as new stores, competitors, when advertisements were provided, deals, etc.). The server 116 takes the inter-purchase time per customer, the other information 306-314, and generates a rate of sales model based on the data available. The server 116 then applies multiple machine learning models on the rate of sales model 316, resulting in multiple forecasts of what future sales will be based on current conditions. The server 116 selects one of these forecasts based on factors such as past performance, level of accuracy, etc., and tunes a machine learning model parameter to limit overfitting 320. In other words, the server 116 modifies a parameter to account for noise or any idiosyncrasies in the data being processed. The selected sales model is then updated with the modified parameter 322, and the updated rate of sales model is used to predict a next purchase 324. As sales data is received in real-time, the rate of sales model can be refreshed on a periodic basis 326 (i.e., once a day, once a week, etc.). This model can then be applied to new sales data and be used in future calculations 304, use of models 316, etc. In addition, the predictions made by the models not selected by the server at step 316 can be recorded to evaluate which models are best at predicting sales and the effect of sales, which can result in iterative improvements to the selection of the models and the models themselves.

Figure 4:
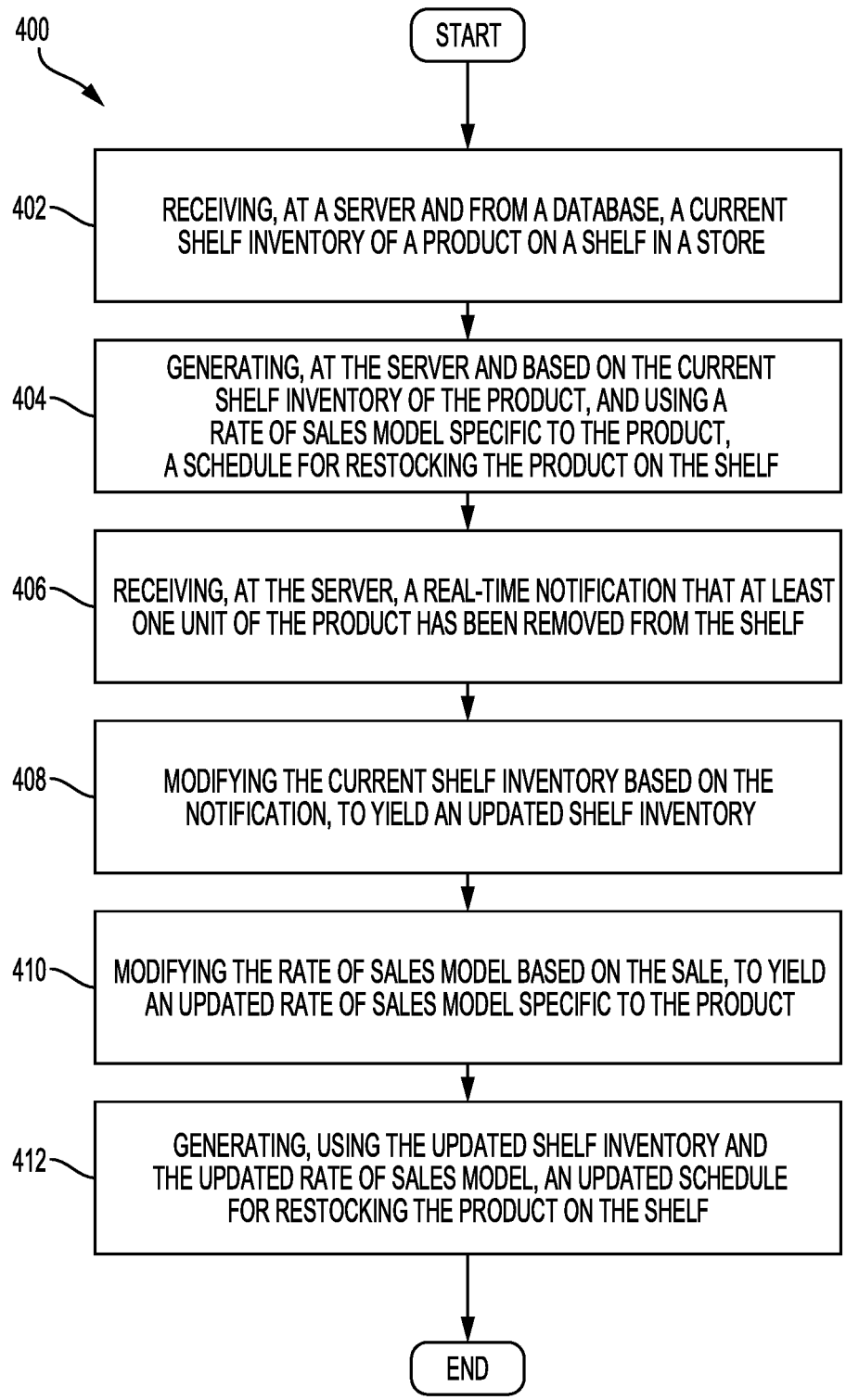
FIG. 4 illustrates an example method embodiment.

FIG. 4 illustrates an example method embodiment 400. In this example 400, a server 116 as illustrated in FIG. 1 is performing the method. The method includes receiving, at a server 116 and from a database, a current shelf inventory of a product on a shelf in a store (402). The server 116 generates, based on the current shelf inventory of the product, and using a rate of sales model specific to the product, a schedule for restocking the product on the shelf (404). The server 116 receives a real-time notification that at least one unit of the product has been removed from the shelf (406) and modifies the current shelf inventory based on the notification, to yield an updated shelf inventory (408). The server 116 also modifies the rate of sales model based on the sale, to yield an updated rate of sales model specific to the product (410), and generates, using the updated shelf inventory and the updated rate of sales model, an updated schedule for restocking the product on the shelf (412).

In certain configurations, this method can be further expanded to include identifying, within one of the rate of sales model and the updated rate of sales model, an amount of inventory corresponding to an apex rate of sales of the product. In such configurations, at least one of the schedule and the updated schedule can be generated to maintain shelf inventory of the product within a threshold range of the amount of inventory corresponding to the apex rate of sales.

In some configurations, the modifying of the rate of sales model is performed using machine learning, wherein the machine learning uses a machine learning model which is updated on a periodic basis, the updates to the machine learning model being based on predictive ability of the machine learning model regarding sales of the product.

In still other configurations, the rate of sales model identifies distinct rates of sales of the product when the shelf is full and when the shelf is half-full, and/or identifies an amount of inventory for the shelf below which a rate of sales of the product decreases.

Modifying the current shelf inventory and modifying of the rate of sales model can occur in real-time after each sale of the product, or upon identifying that a product has been removed from a shelf. For example, a real-time notification can be generated at a point of sale of the at least one unit (i.e., when a cash register is used to sell the item to the customer), or the real-time notification can be generated based on a video feed analysis identifying a change in the current shelf inventory. As another possibility, the real-time notification can be generated based on weight sensor associated with the shelf identifying a change in shelf weight associated with the current shelf inventory.

Figure 5:
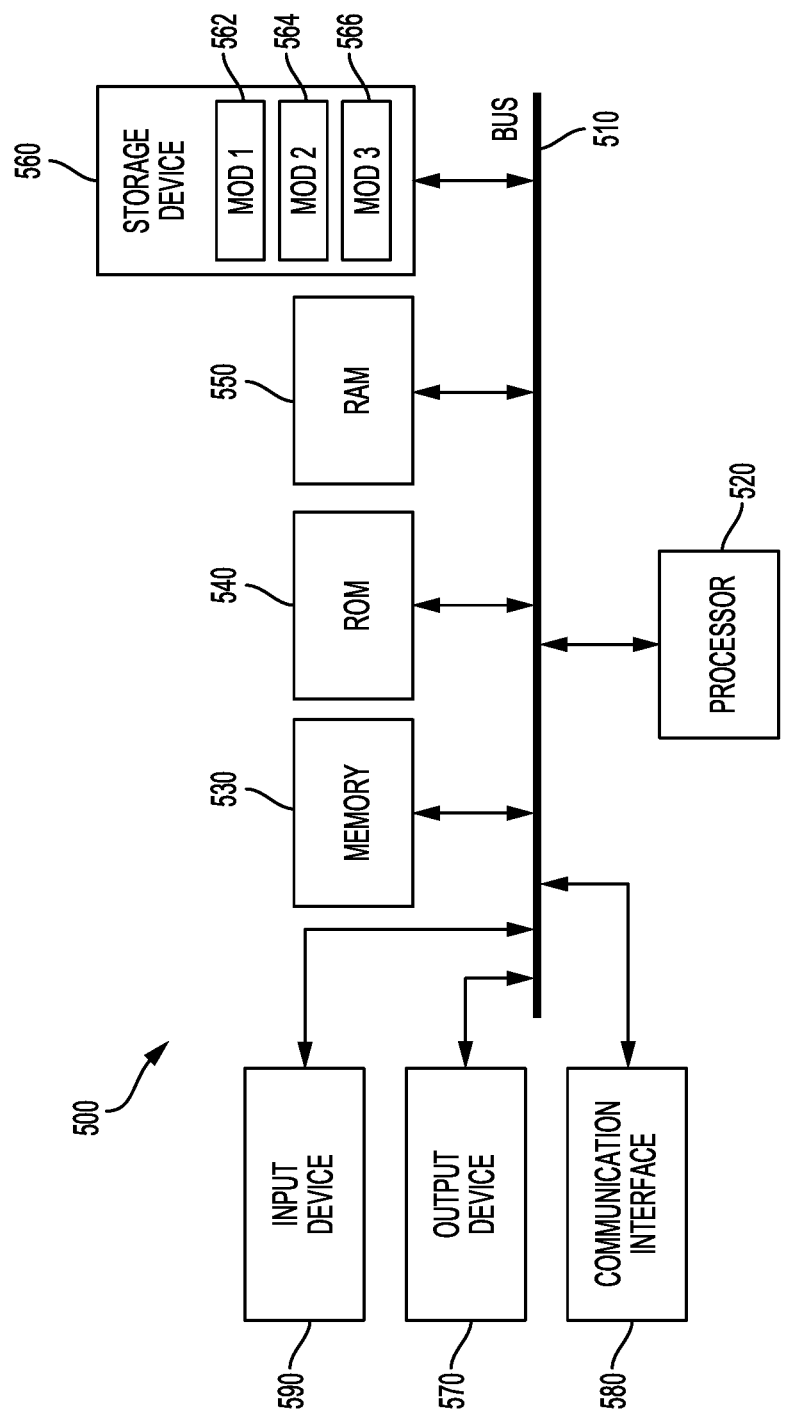
FIG. 5 illustrates an example computer which can be used to perform the concepts disclosed herein.

With reference to FIG. 5, an exemplary system 500 includes a general-purpose computing device 500, including a processing unit (CPU or processor) 520 and a system bus 510 that couples various system components including the system memory 530 such as read only memory (ROM) 540 and random access memory (RAM) 550 to the processor 520. The system 500 can include a cache of high speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

The steps and concepts described herein are exemplary and can be implemented in any combination thereof, including combinations that exclude, add, or modify certain steps and/or elements. The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A system comprising:
one or more processors; and
memory resource storing a set of instructions, that when executed by the one or more processors, cause the one or more processors to:
receive, from a database, a current shelf inventory of a product on a shelf in a store;
generate multiple forecasts of future sales by applying a plurality of machine learning models on a rate of sales model associated with the product;
select a single forecast from the multiple forecasts based on past performance of a machine learning model the plurality of machine learning models which generated the single forecast;
tune the machine learning model to avoid overfitting;
update inter-purchase times for the product based on updated sales data, the updated sales data including information indicating one or more instances at least one unit of the product was removed from the shelf;
update the rate of sales model based on the updated inter-purchase times; and
generate, based at least on the updated rate of sales model, a restocking schedule for the product.

2. The system of claim 1, wherein execution of the set of instructions, by the one or more processors, further causes the one or more processors to:
transmit, to an autonomous vehicle, one or more instructions based on the restocking schedule, the one or more instructions causing the autonomous vehicle to implement one or more restocking operations to restock the product on the shelf.

3. The system of claim 1, wherein execution of the set of instructions, by the one or more processors, further causes the one or more processors to:
transmit, to a computing device of a store associate, one or more restocking instructions based on the restocking schedule.

4. The system of claim 1, wherein execution of the set of instructions, by the one or more processors, further causes the one or more processors to:
identify, within one of the rate of sales model and the updated rate of sales model, an amount of inventory corresponding to an apex rate of sales of the product.

5. The system of claim 4, wherein generation of the restocking schedule for the product is further based on a threshold range of the amount of inventory corresponding to the apex rate of sales.

6. The system of claim 1, wherein the machine learning model is updated on a periodic basis, the updates to the machine learning model being based on predictive ability of the machine learning model regarding sales of the product.

7. The system of claim 6, wherein execution of the set of instructions, by the one or more processors, further causes the one or more processors to:
receive the updated sales data; and
modifying the current shelf inventory based on the updated sales data.

8. The system of claim 7, wherein the modification of the current shelf inventory and the modifying of the rate of sales model occur in real-time after each sale of the product.

9. The system of claim 1, wherein the rate of sales model identifies distinct rates of sales of the product when the shelf is full and when the shelf is half-full.

10. A computer-implemented method comprising:
receiving a current shelf inventory of a product on a shelf in a store;
generating multiple forecasts of future sales by applying a plurality of machine learning models on a rate of sales model associated with the product;
selecting a single forecast from the multiple forecasts based on past performance of a machine learning model the plurality of machine learning models which generated the single forecast;
tuning the machine learning model to avoid overfitting;
updating inter-purchase times for the product based on updated sales data, the updated sales data including information indicating one or more instances at least one unit of the product was removed from the shelf;
updating the rate of sales model based on the updated inter-purchase times; and
generating, based at least on the updated rate of sales model, a restocking schedule for the product.

11. The computer-implemented method of claim 10, further comprising:
transmitting, to an autonomous vehicle, one or more instructions based on the restocking schedule, the one or more instructions causing the autonomous vehicle to implement one or more restocking operations to restock the product on the shelf.

12. The computer-implemented method of claim 10, further comprising:
transmitting, to a computing device of a store associate, one or more restocking instructions based on the restocking schedule.

13. The computer-implemented method of claim 10, further comprising:
identifying, within one of the rate of sales model and the updated rate of sales model, an amount of inventory corresponding to an apex rate of sales of the product.

14. The computer-implemented method of claim 13, wherein generation of the restocking schedule for the product is further based on a threshold range of the amount of inventory corresponding to the apex rate of sales.

15. The computer-implemented method of claim 10, wherein the machine learning model is updated on a periodic basis, the updates to the machine learning model being based on predictive ability of the machine learning model regarding sales of the product.

16. The computer-implemented method of claim 15, further comprising:
receive the updated sales data; and
modifying the current shelf inventory based on the updated sales data.

17. The computer-implemented method of claim 16, wherein the modification of the current shelf inventory and the modifying of the rate of sales model occur in real-time after each sale of the product.

18. The computer-implemented method of claim 10, wherein the rate of sales model identifies distinct rates of sales of the product when the shelf is full and when the shelf is half-full.

19. A non-transitory computer-readable medium storing instructions, that when executed by one or more processors, causes the one or more processors to:
receive, from a database, a current shelf inventory of a product on a shelf in a store;
generate multiple forecasts of future sales by applying a plurality of machine learning models on a rate of sales model associated with the product;
select a single forecast from the multiple forecasts based on past performance of a machine learning model the plurality of machine learning models which generated the single forecast;
tune the machine learning model to avoid overfitting;
update inter-purchase times for the product based on updated sales data, the updated sales data including information indicating one or more instances at least one unit of the product was removed from the shelf;
update the rate of sales model based on the updated inter-purchase times; and
generate, based at least on the updated rate of sales model, a restocking schedule for the product.

20. The non-transitory computer-readable medium of claim 19, wherein execution of the set of instructions, by the one or more processors, further causes the one or more processors to:
transmit, to an autonomous vehicle, one or more instructions based on the restocking schedule, the one or more instructions causing the autonomous vehicle to implement one or more restocking operations to restock the product on the shelf.

* * * * *